(12) United States Patent
Steinberg et al.

(10) Patent No.: US 9,189,819 B2
(45) Date of Patent: Nov. 17, 2015

(54) PERSONALIZING AN APPLICATION WITH CONTENT FROM A SOCIAL NETWORKING SYSTEM

(75) Inventors: Arieh Steinberg, Menlo Park, CA (US); Vijaye Ganesh Raji, Redmond, WA (US); Jack O'Connor, Kirkland, WA (US)

(73) Assignee: Facebook, Inc., Menlo Park, CA (US)

( * ) Notice: Subject to any disclaimer, the term of this patent is extended or adjusted under 35 U.S.C. 154(b) by 635 days.

(21) Appl. No.: 13/451,791

(22) Filed: Apr. 20, 2012

(65) Prior Publication Data
US 2013/0282806 A1  Oct. 24, 2013

(51) Int. Cl.
*G06F 15/173* (2006.01)
*G06Q 50/00* (2012.01)

(52) U.S. Cl.
CPC ..................... *G06Q 50/01* (2013.01)

(58) Field of Classification Search
CPC ....................................... G06Q 50/01
USPC ........... 709/203–204, 217, 246, 226; 715/745
See application file for complete search history.

(56) References Cited

U.S. PATENT DOCUMENTS

| | | | |
|---|---|---|---|
| 8,694,577 B2* | 4/2014 | D'Angelo et al. | 709/203 |
| 2007/0043766 A1 | 2/2007 | Nicholas et al. | |
| 2008/0155031 A1* | 6/2008 | Fortier et al. | 709/206 |
| 2008/0201225 A1* | 8/2008 | Maharajh et al. | 705/14 |
| 2009/0070412 A1* | 3/2009 | D'Angelo et al. | 709/203 |
| 2011/0162038 A1* | 6/2011 | Chunilal | 726/1 |
| 2013/0031162 A1* | 1/2013 | Willis et al. | 709/203 |
| 2013/0080911 A1* | 3/2013 | Klemm | 715/745 |
| 2013/0097238 A1* | 4/2013 | Rogers et al. | 709/204 |
| 2013/0282806 A1* | 10/2013 | Steinberg et al. | 709/204 |
| 2014/0108518 A1* | 4/2014 | D'Angelo et al. | 709/203 |
| 2014/0143087 A1* | 5/2014 | Ahn et al. | 705/26.7 |
| 2014/0279050 A1* | 9/2014 | Makar et al. | 705/14.66 |

FOREIGN PATENT DOCUMENTS

| | | |
|---|---|---|
| JP | 2003-308298 A | 10/2003 |
| KR | 10-2001-044692 A | 6/2001 |
| KR | 10-2005-0095041 A | 9/2005 |
| WO | WO 2009/061617 A1 | 5/2009 |

OTHER PUBLICATIONS

PCT International Search Report and Written Opinion, PCT Application No. PCT/US2013/036046, Jul. 23, 2013, ten pages.

* cited by examiner

*Primary Examiner* — Shirley Zhang
(74) *Attorney, Agent, or Firm* — Fenwick & West LLP (57) ABSTRACT

A third-party application running on a client device sends a request for a user's profile information to a local social networking application running on the client device. The local social networking application sends to the request to the social networking system, receives the requested information from the social networking systems, and provides the requested information to the third-party application. The third-party application uses at least a portion of the requested information to personalize its content for the user. In this way, the third-party application has a simple mechanism for incorporating personalized content for the user based on social information, without requiring the third-party application itself to maintain or even have access to the user's social information.

36 Claims, 4 Drawing Sheets

PERSONALIZING AN APPLICATION WITH CONTENT FROM A SOCIAL NETWORKING SYSTEM

BACKGROUND

This disclosure relates generally to social networking, and in particular to extending social content outside of a social networking system by personalizing an application with content from the social networking system.

In a typical social networking system, such as a social networking website, users set up their user profiles and then establish connections with other users of the social networking system. The users often provide information about themselves expressly to the social networking system, such as demographic information and/or a list of the users' interests. Users may also provide information about themselves implicitly to the social networking system, through their actions on the system and interactions with other users. In this way, a social networking system can obtain a rich set of social information about its users, which may be used in a great many ways to enhance a user's experience online.

However, most applications do not have access to this rich set of social information, and in fact most do not even know the identity of their users. Assembling enough information about a user's social connections for these purposes typically requires an application to interact with a large number of users over an extended period of time, and most applications do not have the resources, expertise, or user base required to build and maintain this social information. Accordingly, these applications will offer an inferior experience, since any customization or personalization provided by these applications is unlikely to reflect information about the user's social connections and their actions.

Accordingly, it would be beneficial to offer a mechanism to third-party applications, which are maintained by an entity that is different from a social networking system, to provide personalized content for their users based on social information about those users that is maintained by, or otherwise accessible to, the social networking system.

SUMMARY

To allow third-party applications to leverage social information maintained in a social networking system, embodiments of the disclosure enable a third-party application to incorporate a user's personalized content with content from the third-party application. The personalized content is provided by the social networking system, which maintains social information about the user.

In one embodiment, a third-party application running on a client device sends a request for a user's profile information to a local social networking application running on the client device. The local social networking application sends to the request to the social networking system, receives the requested information from the social networking systems, and provides the requested information to the third-party application. The third-party application uses at least a portion of the requested information to personalize its content for the user. In this way, the third-party application has a simple mechanism for incorporating personalized content for the user based on social information, without requiring the third-party application itself to maintain or even have access to the user's social information.

In one embodiment, responsive to a request from a third-party application running on a client device, a social networking system receives a request for a user's profile information from a local social networking application running on the client device. The social networking system determines whether to provide the requested information, retrieves the user's profile information, and sends the requested information to the local social networking application. The local social networking application provides the requested information to the third-party application.

Embodiments of the disclosure enable various types of personalized content to be provided on a third-party application. In one example, the personalized content may comprise a "recent activity" window, which contains a selection of actions performed by the user's connections and related to a particular third-party application, or collection of third-party applications. The actions may include various actions tracked, or otherwise collected, by the social networking system that a user may perform in relation to a particular third-party application, such becoming a fan of (or "liking" or otherwise expressing interest in) the third-party application, posting a link about the third-party application web page, or posting a comment that mentions the third-party application. For example, a window of a game may display a user's friends' posts that mention the game. In another example, a media application may provide a window that shows movie reviews (or links thereto), recommendations for, or expressions of interest in movies by the user's friends, by all users of the social networking system, or by users of the social networking system filtered in some other manner (e.g., by location, age group, etc.).

The personalized content provided by the social networking system may be filtered and/or ranked based on a number of criteria, including, without limitation, the user's interests, demographic information, the affinity for other objects in the social networking system, location information, geo-location information, keywords or tags (either dictated by the third-party website and/or by the user), and a decay factor. The criteria may be dictated by the third-party application, for example, by passing the criteria as a parameter in the request to the local social networking application. For example, a gaming application may not care about the user's location, whereas a news reader application would care. In such a case, the third-party application may pass a parameter that comprises a flag, indicating to the social networking system whether the personalized content should be filtered to exclude content that does not match the user's location. It is noted that the third-party application need not know the user's location, as the filtering may be done entirely by the social networking system. In another embodiment, the filtering and/or ranking need not be specified by the third-party application, and can instead be perform by the social networking system. For example, the social networking system may personalize content for a user by applying an affinity function for the user to each content item, thereby providing the user with the content that is most likely to be relevant to the user. A great number of variations and applications are possible, as will be appreciated.

The figures depict various embodiments of the described methods and system and are for purposes of illustration only. One skilled in the art will readily recognize from the following discussion that alternative embodiments of the methods and systems illustrated herein may be employed without departing from the principles of the methods and systems described herein.

DETAILED DESCRIPTION

Process Overview

Figure 1:
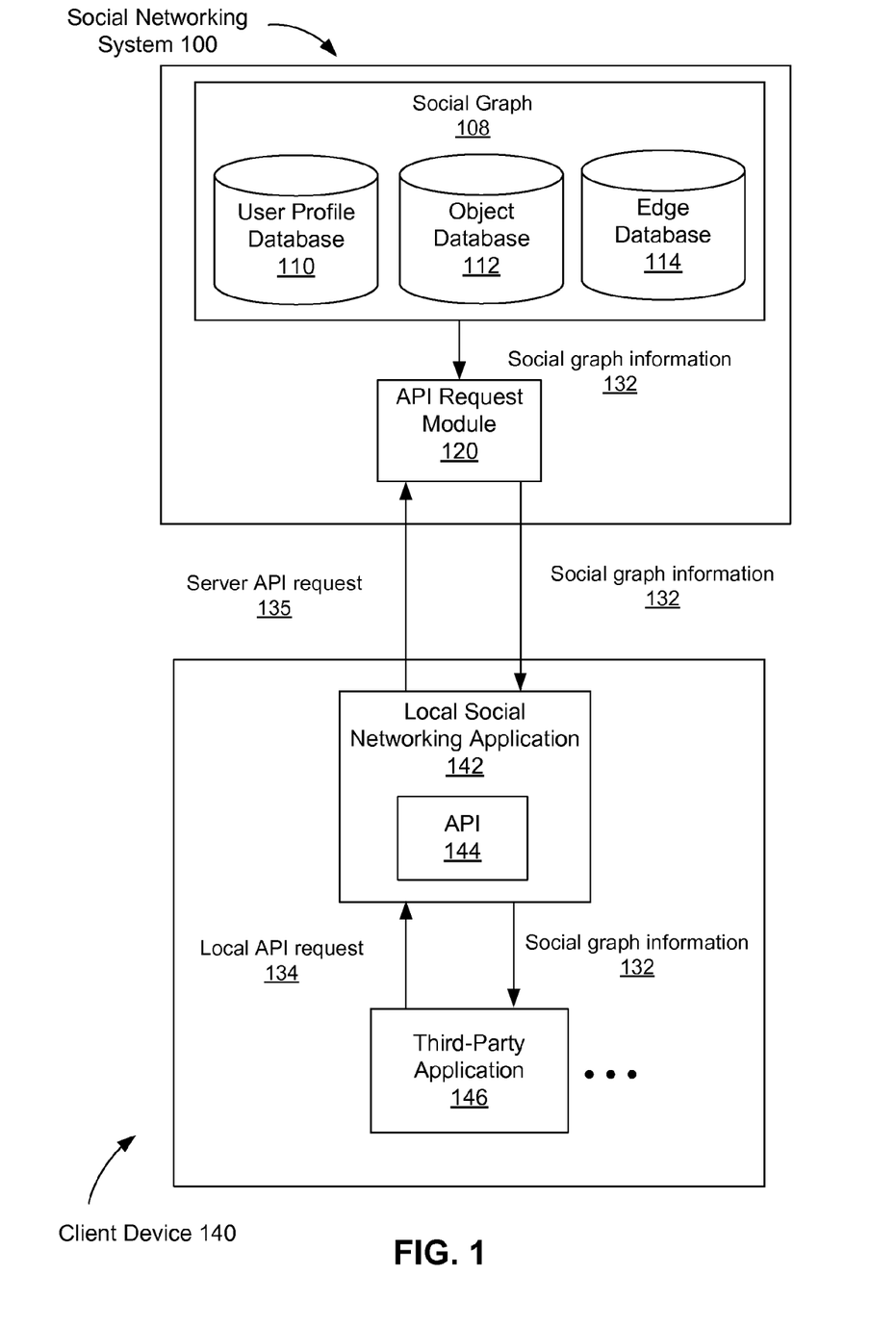
FIG. 1 is a high level block diagram illustrating how a third-party application can interact with a social networking system, in accordance with one embodiment of the disclosure.

FIG. 1 shows the interaction between a client device 140 and a social networking system 100. An individual may be a member of the social networking system 100 and a user of the client device 140. The social networking system 100 stores a social graph 108 that includes information about users, objects, and connections among the users and objects. The client device 140 includes one or more third-party applications 146 and a local social networking application 142. A third-party application 146 is provided and maintained by an entity other than the provider of the social networking system 100. The local social networking application 142 is executed on the client device 140 and relays information between the third-party applications 146 and the social networking system 100. In some embodiments, the local social networking application 142 is embedded in another application capable of communicating with the social networking system 100 such as a web browser application. For example, the local social networking application 142 may be a web browser plug-in. The local social networking application may be provided by the social networking system and installed on the client device 140 by a user of the client device. The local social networking application 142 includes an application programming interface (API) 144 that enables communication with the third-party application 146. An API is an interface implemented by a software program that enables it to interact with other programs.

The third-party application 146 may receive a user's information several ways. In some embodiments, the third-party application 146 sends the social networking system 100 a request for information containing an access token provided to the third-party application 146 by the local social networking application 142. In some embodiments, the third-party application 146 obtains the user's information from the local social networking application 142. In some embodiments, the local social networking application 142 stores information about a user and provides the information in response to requests from the third-party application 146. In some embodiments, the local social networking application 142 acts as a proxy for the social networking system 100 and relays information between the third-party application 146 and the social networking system 100.

In some embodiments, the local social networking application 142 responds to requests from the third-party application 146 with information that is stored by the local social networking application 142. The local social networking application 142 may store a subset or all of the user's information. The local social networking application 142 may periodically request the user's information from the social networking application 100 or may request the information after the user is authenticated on the social networking system 100.

In some embodiments, the local social networking application 142 provides the third-party application 142 with an access token. The third-party application 142 may use the access token to request information directly from the social networking system 100. In some embodiments, the local social networking application 142 generates an access token. In some embodiments, the access token is generated or retrieved after a user has been authenticated. The access token may include information that allows the social networking system 101 to identify the user.

In some embodiments, the local social networking application 142 relays information between the third-party application 146 and the social networking systems 100. In some embodiments, the local social networking application 142 receives a local API request 134 from a third-party application 146, generates a server API request 135, sends the server API request 135 to the social networking system 100, receives the requested information from the social networking system 100, and sends the requested information to the requesting third-party application 146.

In some embodiments, the local social networking application 142 stores or obtains a user identifier for a user who has been authenticated on the social networking system 100 and inserts the user identifier into the server API request 135. In this way, the third-party application 146 does not need to ask a user for their login information and does not need to include a user identifier in the local API request 134 sent to the local social networking application 142. The user identifier identifies the user's profile on the social networking system 100 and is used to uniquely identify the user. In some embodiments, the local social networking application 142 stores a user identifier for a user after the user logins to the social networking system 100. In some embodiments, the local social networking application 142 sends a request to the social networking system 100 to identify a user of the client device 140 who has been authenticated on the social networking system 100. In some embodiments, the local social networking application 142 does not send requests for information to the social networking system 100 when there are no users of the client device 140 logged into the social networking system 100. Stated in another way, the local social networking application 142 does not retrieve information from the social networking system 100 when the user has not been authenticated on the social networking system 100.

In some embodiments, responsive to receiving the local API request 134 from the third-party application 146, the local social networking application 142 may display an authorization request to the user which prompts the user to allow or deny the third-party application 146 access to the user's social graph information. The local social networking application 142 may do this the first time the third-party application request 146 requests the user's social graph information or if the user previously prevented the third-party application 146 from accessing the user's information. In some embodiments, the local social networking application 142 communicates with the social networking system in order to determine whether a third-party application 142 is authorized to request the user's information. In some embodiments, the local social networking application 142 sends a message to the social networking system 100 to update the user's privacy settings based on the user's reply to the authorization request.

The server API request 135 sent from the local social networking application 142 to the social networking system 100 may be used to request information from the social networking system 100 and to send information and content to the social networking system 100. In some embodiments, the server API request 135 includes a request to save information and/or content provided by the third-party application 146.

For example, a game may send a user's game scores to the social networking system 100 which may save the scores to the user's profile and/or provide the scores to other users.

The third-party application 146 may retrieve information from the social networking system via the local social networking system 142. The third-party application 146 communicates with the local social networking application 142 using an application programming interface (API). As illustrated in FIG. 1, the third-party application 146 sends a local API request 134 to the local social networking application 142 to request social graph information associated with a user and receives at least a portion of the requested social graph information 132 from the local social networking application 142. The third-party application 146 may use the social graph information 132 for various purposes. The third-party application 146 may display at least a portion of the social graph information 132 in conjunction with content from the third-party application 146 to a user. For example, a game may display a user's gaming statistics along with the user's friends' gaming statistics.

In some embodiments, the third-party application 146 sends data to the social networking system 100 via the local social networking application 142. In some embodiments, the data includes content created by the user of the third-party application 146. For example, the user may post a status message, a picture, link, or a comment to the social networking system 100 using the third-party application 146. In some embodiments, the data includes information describing the user's activity with respect to the third-party application 146. For example, the data may describe the media items the user has consumed using the third-party application 146.

The social networking system 100 includes an API request module 120 that receives and responds to requests from the local networking application 142. The API request module 120 receives a server API request 135 from a local social networking application 142, identifies the user and the third-party application, retrieves at least a portion of the requested information 132, and sends the social graph information 132 to the local social networking application 142. In some embodiments, the API request module 120 receives a request from the local social networking application 142 to save and post information and/or content to one or more communication channels of the social networking system 100. For example, the API request module 120 may receive a request to save a picture to a user's photo album and to make the picture available to the user's friends.

The social networking system 100 includes a social graph 108 that stores user profile objects, edge objects and content objects. User profile objects include declarative profile information about the viewing user. Edge objects include information about the viewing user's interactions with other objects on the social networking system 100, such as clicking on a link shared with the viewing user, sharing photos with other users of the social networking system, posting a status update message on the social networking system 100, and other actions that may be performed on the social networking system. The similarity score measures the similarity between two objects and represents the likelihood that a user would be interested in one of the objects. Content objects include event objects created by users of the social networking system 100, status updates that may be associated with event objects, photos tagged by users to be associated with other objects in the social networking system 100, such as events, pages, and other users, and applications installed on the social networking system 100.

System Environment

Figure 2:
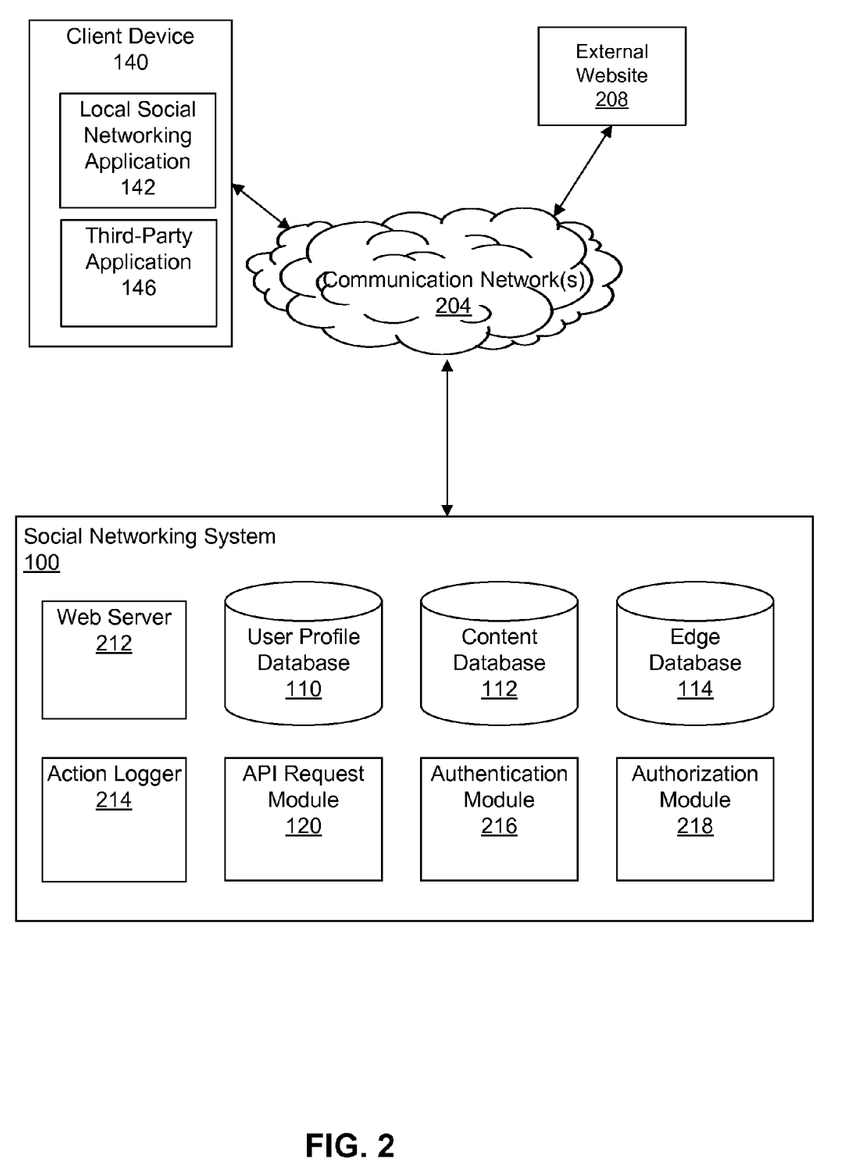
FIG. 2 is a high level block diagram of a social networking system, in accordance with some embodiments.

FIG. 2 is a high level block diagram illustrating a system environment, in accordance with one embodiment. The system environment comprises one or more client devices 140, the social networking system 100, a network 204, and external websites 208. In alternative configurations, different and/or additional modules can be included in the system. In some embodiments, the social networking system 100 is implemented as a single server, while in other embodiments it is implemented as a distributed system of multiple servers. For convenience of explanation, the social networking system 100 is described below as being implemented on a single server system.

The communication network(s) 204 can be any wired or wireless local area network (LAN) and/or wide area network (WAN), such as an intranet, an extranet, or the Internet. It is sufficient that the communication network 204 provides communication capability between the user devices 140 and the social networking system 100. In some embodiments, the communication network 204 uses the HyperText Transport Protocol (HTTP) and the Transmission Control Protocol/Internet Protocol (TCP/IP) to transmit information between devices or systems. HTTP permits the client devices 140 to access various resources available via the communication network 204. The various embodiments of the disclosure, however, are not limited to the use of any particular protocol.

The client devices 140 comprise one or more computing devices that can receive user input and can transmit and receive data via the network 204. In one embodiment, an client device 140 is a conventional computer system executing, for example, a Microsoft Windows-compatible operating system (OS), Apple OS X, and/or a Linux distribution. In another embodiment, an client device 140 can be a device having computer functionality, such as a personal digital assistant (PDA), mobile telephone, smart-phone, etc. The client device 140 is configured to communicate via network 204. The client device 140 can execute an application, for example, a browser application that allows a user of the client device 140 to interact with the social networking system 100. In another embodiment, the client device 140 interacts with the social networking system 100 through an application programming interface (API) that runs on the native operating system of the client device 140, such as iOS and ANDROID.

The web server 212 links the social networking system 100 via the network 204 to one or more client devices 140; the web server 212 serves web pages, as well as other web-related content, such as Java, Flash, XML, and so forth. The web server 212 may provide the functionality of receiving and routing messages between the social networking system 100 and the client devices 140, for example, instant messages, queued messages (e.g., email), text and SMS (short message service) messages, or messages sent using any other suitable messaging technique. The user can send a request to the web server 212 to upload information, for example, images or videos that are stored in the content database 112. Additionally, the web server 212 may provide API functionality to send data directly to native user device operating systems, such as iOS, ANDROID, webOS, and BlackBerry OS.

The action logger 214 is capable of receiving communications from the web server 212 about user actions on and/or off the social networking system 100. The action logger 214 populates an action log with information about user actions to track them. Such actions may include, for example, adding a connection to the other user, sending a message to the other user, uploading an image, reading a message from the other user, viewing content associated with the other user, attending an event posted by another user, among others. In addition, a number of actions described in connection with other objects are directed at particular users, so these actions are associated with those users as well.

An action log may be used by a social networking system 100 to track users' actions on the social networking system 100 as well as external websites that communicate information back to the social networking system 100. As mentioned above, users may interact with various objects on the social networking system 100, including commenting on posts, sharing links, and checking-in to physical locations via a mobile device. The action log may also include user actions on external websites. For example, an e-commerce website that primarily sells luxury shoes at bargain prices may recognize a user of a social networking system 100 through social plug-ins that enable the e-commerce website to identify the user of the social networking system. Because users of the social networking system 100 are uniquely identifiable, e-commerce websites, such as this luxury shoe reseller, may use the information about these users as they visit their websites. The action log records data about these users, including viewing histories, advertisements that were clicked on, purchasing activity, and buying patterns.

User account information and other related information for users are stored as user profile objects in the user profile database 110. The user profile information stored in user profile database 110 describes the users of the social networking system 100, including biographic, demographic, and other types of descriptive information, such as work experience, educational history, gender, hobbies or preferences, location, and the like. The user profile may also store other information provided by the user, for example, images or videos. In certain embodiments, images of users may be tagged with identification information of users of the social networking system 100 displayed in an image. The user profile database 110 also maintains references to the actions stored in an action log and performed on objects in the content database 112.

The edge database 114 stores the information describing connections between users and other objects on the social networking system 100 in edge objects. Some edges may be defined by users, allowing users to specify their relationships with other users. For example, users may generate edges with other users that parallel the users' real-life relationships, such as friends, co-workers, partners, and so forth. Other edges are generated when users interact with objects in the social networking system 100, such as expressing interest in a page on the social networking system, sharing a link with other users of the social networking system, and commenting on posts made by other users of the social networking system. The edge database 114 stores edge objects that include information about the edge, such as affinity scores for objects, interests, and other users. Affinity scores may be computed by the social networking system 100 over time to approximate a user's affinity for an object, interest, and other users in the social networking system 100 based on the actions performed by the user. Multiple interactions between a user and a specific object may be stored in one edge object in the edge store 114, in one embodiment. For example, a user that plays multiple songs from Lady Gaga's album, "Born This Way," may have multiple edge objects for the songs, but only one edge object for Lady Gaga.

The authentication module 216 authenticates a user accessing the social networking system 100 with a client device 140 and verifies that a user is authenticated on the social networking system 100. In order for a user to be authenticated, the user may need to provide a username and password associated with the user's account. After a user is authenticated, the authentication module 216 sends a user identifier of the authenticated user to the local social networking application 142. As discussed above, the local social networking application 142 may store the user identifier for subsequence use.

The authorization module 218 manages and enforces one or more privacy settings of the users of the social networking system 100. A privacy setting of a user determines how particular information associated with a user can be shared. The privacy setting comprises the specification of particular information associated with a user and the specification of the entity or entities with whom the information can be shared. Examples of entities with which information can be shared may include other users, third-party applications, third-party websites or any entity that can potentially access the information. The information that can be shared by a user comprises user profile information like profile photo, phone numbers associated with the user, user's connections, actions taken by the user such as adding a connection, changing user profile information and the like.

The privacy setting specification may be provided at different levels of granularity. For example, the privacy setting may identify specific information to be shared with other users. For example, the privacy setting identifies a work phone number or a specific set of related information, such as, personal information including profile photo, home phone number, and status. Alternatively, the privacy setting may apply to all the information associated with the user. The specification of the set of entities that can access particular information can also be specified at various levels of granularity. Various sets of entities with which information can be shared may include, for example, all friends of the user, all friends of friends, all applications, all third-party websites, specific third-party websites, specific client devices, all client devices 140, specific third-party application, or all third-party applications. One embodiment allows the specification of the set of entries comprise an enumeration of entities, for example, the user may select a list of third-party applications that are allowed to access certain information. Another embodiment allows the specification to comprise a set of entities along with exceptions that are not allowed to access the information. For example, a user may allow all third-party applications to access the user's work information but specify a list of third-party applications that are not allowed to access the work information. Certain embodiments call the list of exceptions that are not allowed to access certain information a block list. Third-party applications belonging to a block list specified by a user are blocked from accessing the information specified in the privacy setting. Note that the various combinations of granularity of specification of information and the granularity of specification of entities with which information is shared are possible, i.e., all personal information may be shared with friends whereas all work information may be shared with friends of friends.

For example, a user's privacy setting indicates that a first application is allowed to access the user's profile photo while preventing the first application from accessing other information about the user, such as the user's work phone number or the user's list of friends. However, the user's privacy setting indicates that a second application is allowed to access the user's friend list. The information associated with a user includes actions taken by a user such as the action of adding a new friend. The user can completely block another user or an application from accessing any information associated with the user. A user or an application that is blocked by the user does not have access to any information associated with user.

The authorization module 218 contains logic to determine if certain information associated with a user can be accessed by a user's friends, third-party websites, third-party applications, and/or entities. Based on the user's privacy settings, the authorization module 216 determines if another user, a third-party website, an application or another entity is allowed to access information associated with the user, including information about actions taken by the user. For example, the authorization module 218 uses a users privacy setting to determine if the user's comment about a URL associated with a third-party website can be accessed by the third-party application. This enables a user's privacy setting to specify which other users, or other entities, are allowed to receive data about the user's actions or other data associated with the user.

In some embodiments, the authorization module 218 determines which portions of the requested information a third-party is authorized to access, retrieves the information, and sends the information to the API request module 120 which sends the information to the local social networking application 142.

Personalizing an Application with Content from a Social Networking System

Figure 3:
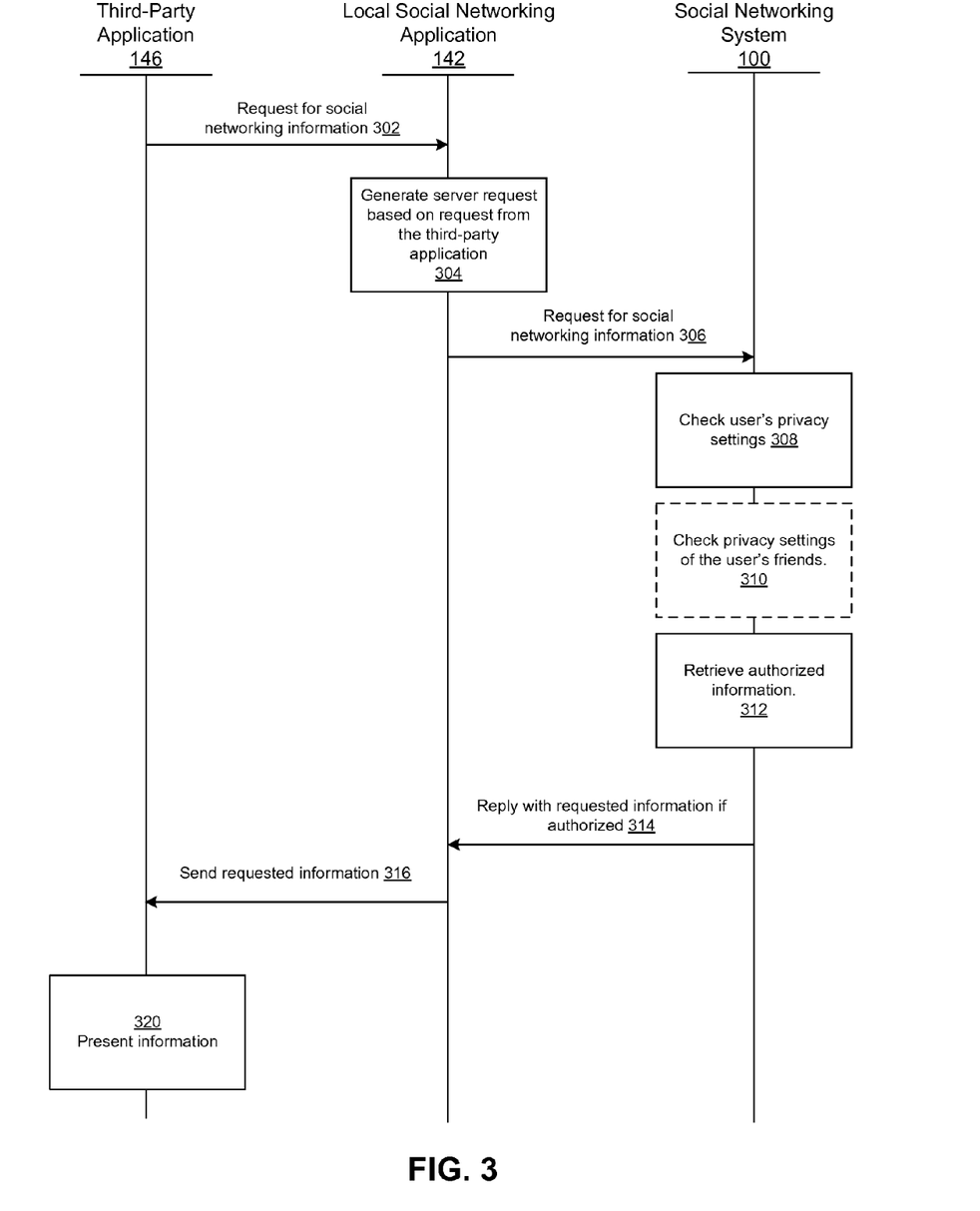
FIG. 3 is an interaction diagram of a process in which a third-party application obtains information about a user of a social networking system.

FIG. 3 is a flow chart of a process 300 by which a third-party application 146 accesses information associated with a user from the social networking system 100. In the embodiment shown by FIG. 3, the third-party application 146 and the local social networking application 142 are executed on a client device 140 that is separate from the social networking system 100.

In this process 300, the third-party application 146 sends 302 a request for social graph information associated with a user to the local social networking application 142. In some embodiments, the request is sent responsive to the user taking an action on the third-party application 146. For example, the user may select a user interface element of the third-party application 146. In some embodiments, the request is sent without any user action to initiate the request and may be sent when the third-party application 146 determines a need for a user's information from the social networking system 100. For example, a game may want to present the user with a list of the user's friends who also play the game. The request may also be sent by the third-party application 146 when the third-party application 146 is initially executed. In some embodiments, the request is sent from the third-party application 146 without the user providing login information to the third-party application 146. Stated in another way, the user does not need to provide a username and password for the social networking system 100 to the third-party application 146 in order for the third-party application 146 to request social graph information associated with the user.

The request may be any information for the user that is maintained by the social networking system 100. In some embodiments, the request is for profile information of the user. For example, the request may for the user's name, identifier, email address, location, or address. In some embodiments, the request includes a request for a user's notifications. The notifications identify an action or activity that took place on the social networking system 100. For example, the notifications may indicate that the user has a new message, that someone has requested to become friends with the user, or that someone commented on the user's posted content. In some embodiments, the request for information includes a request for the user's friends list. In some embodiments, the request for information includes a request for messages sent to the user in the social networking system. In some embodiments, the request for information includes a request for content posted by the user or the user's friends. The content, for example, may include photos, status messages, comments, URL links, or any combination thereof. In some embodiments, the request for information includes a request for information about the activities of a user's friends. In some embodiments, the request for information includes a request for recommendations. The recommendations may be for applications, products, services, content, links, or any combination thereof.

In some embodiments, the request sent from the third-party application 146 to the local social networking application 142 does not include information identifying the user. For example, the request does not include a user identifier, username, or e-mail address.

In some embodiments, the request sent from the third-party application 146 to the local social networking application 142 includes criteria used to filter and/or rank the requested information.

In some embodiments, after receiving the request from the third-party application 142, the local social networking 142 provides the requested content to the third-party application 142. In this case, the local social networking 142 may store at least a portion of the user's information. For example, the local social networking 142 may periodically request information about the user from the social networking system 100 or may request information about a user form the social networking system 100 after the user is authenticated on the social networking system 100.

In some embodiments, after receiving the request from the third-party application 142, the local social networking 142 provides the third-party application 142 with an access token. The third-party application 142 uses the access token to obtain the user's information directly form the social networking system 100. More specifically, the third-party application 142 sends a request to the social networking application 100 containing the access token.

After receiving the request from the third-party application 142, the local social networking application 142 generates 304 a server request based on the request from the third-party application 142. In some embodiments, the local social networking application 142 obtains or retrieves a user identifier for the user and inserts the user identifier into the server request. In some embodiments, the local social networking application 142 obtains the user identifier from the social networking system 100. In some embodiments, the local social networking application 142 inserts an application identifier that identifies the third-party application into the server request. The local social networking application 142 sends 306 the sever request to the social networking system 100.

After receiving the request, the API request module 120 of the social networking system 100 identifies the user and the third-party application 146. In some embodiments, the API request module 120 identifies the user and the third-party application 146 from a user identifier and an application identifier contained in the request. In some embodiments, when the request is associated with multiple users, the API request module 120 identifies each user associated with the request. For example, the API request module 120 may identify multiple user identifiers contained in the request. The API request module 120 sends a request to the authorization module 218 to determine whether the users associated with the request have authorized the third-party application 146 to access the requested information.

The authorization module 218 checks 308 the user's privacy settings in order to determine whether the third-party application 146 is authorized to access the requested information. More specifically, the authorization module 218 retrieves the user's privacy settings and determines which portions of the requested information the third-party application 146 is authorized to access. In some embodiments, the user's privacy settings allow the third-party application 146 to access a subset of the requested information. For example, the user's privacy settings may allow the third-party application 146 to access the user's profile picture but not user's phone number. In some embodiments, when the requested information is associated with multiple users of the social networking system, the authorization module 218 checks 310 the privacy settings of all the users associated with the request in order to determine which portion of the requested information to send to the third-party application 146. The third-party application 146 can at most access the same amount of information as the user corresponding to the request. Stated in another way, a user who is not allowed to access certain information in the social networking system 100 is not allowed the access the same information when using the third-party application 146.

The authorization module 218 retrieves 312 the information that is authorized by the user's privacy settings and/or the user's friends' privacy settings. In some embodiments, the authorization module 218 retrieves the information based on criteria contained in the request. As discussed above, the information from the social networking system may be filtered and/or ranked based on a number of criteria. For example, a media application may want media consumption information for friends of the user who live in the same city as the user. In some embodiments, the authorization module 218 stores criteria for the third-party application 146 and retrieves the information based on the stored criteria. For example, the authorization module 218 may retrieve content items based on an affinity function for the user and the content items, thereby providing the third-party application 146 with content that is likely to be relevant to the user.

The authorization module 218 sends the retrieved information to the API request module 120 which sends 314 the requested information to the local social networking application 142. The local social networking application 142 receives the requested information and sends 316 the information to the third-party application 146.

In some embodiments, after receiving the requested information, the third-party application 146 combines the requested information with content from the third-party application 146. The third-party application then presents 320 the combined information to the user.

EXAMPLE

Figure 4:
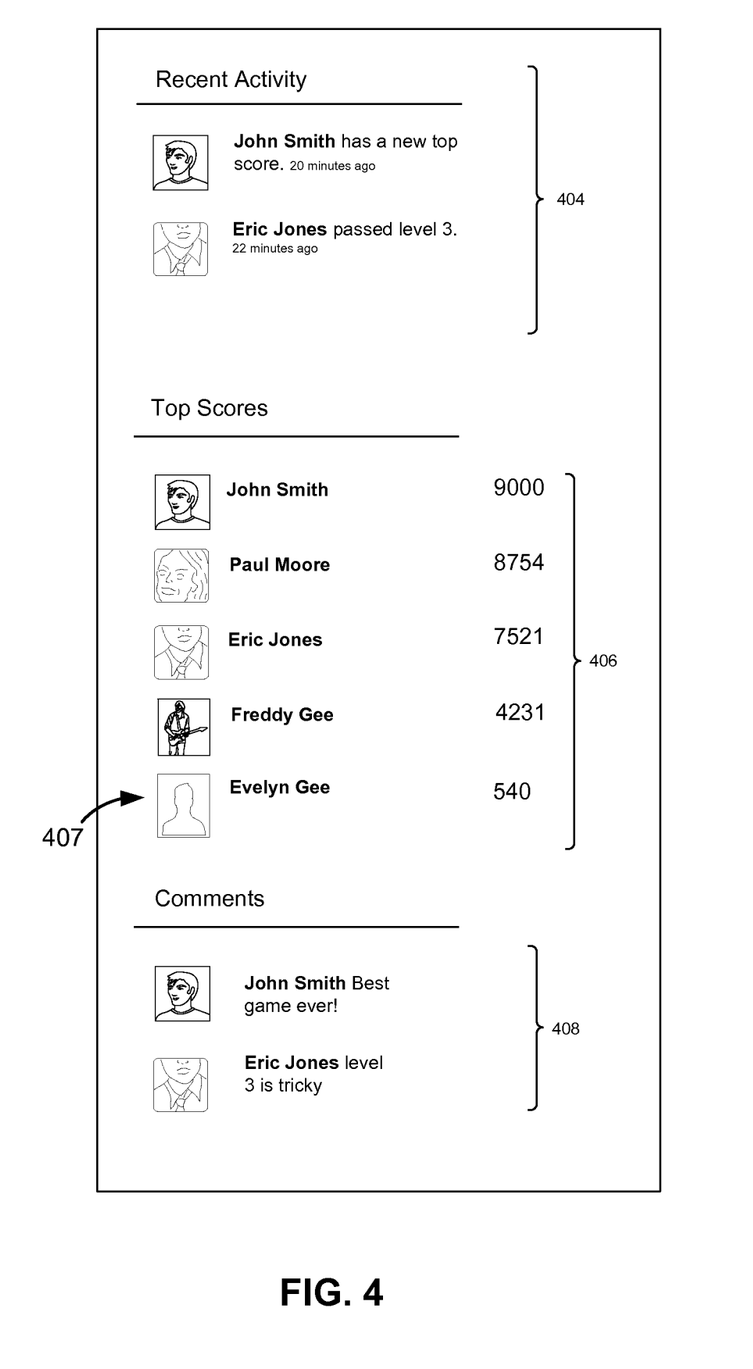
FIG. 4 is an example display from a third-party application that incorporates information from a social networking system, in accordance with some embodiments.

FIG. 4 shows an example of an output by a third-party application 146 that combines information from a social networking system 100 with content from the third-party application 146. In this example, the third-party application 146 is a game that displays recent activity 404 related to the game, top scores 406 for the game, and comments 408 about the game. The top scores 406, recent activity 404, and comments 408 include information from the user and the user's friends. For example, the top scores 406 may show the user's top score along with user's friends' top scores.

As discussed above, the information retrieved from the social networking system 100 is subject to the user's privacy settings and the user's friends' privacy settings. In the example of FIG. 4, the game received a subset of the requested profile pictures of the users. For example, one of the users is represented by a default profile picture 407 to indicate that the corresponding user did not allow the game to access to the user's profile picture.

The game may also send information about a user's activities to the social networking system. For example, the game may send a user's scores or information about the user's gaming achievements to the social networking system 100 via the local social networking application 142. The social networking system 100 may save this information to the user's profile and/or provide this information to the user's friends.

Other applications may similarly provide various functionalities that leverage the social graph information contained in the social networking system 100. For example, a media application where a user can view videos or listen to music may present a user with information related to the user's friends' media consumption activity. This information may be filtered based on information from the user's profile, for example, a user that lists a certain artist, author or actor as part of the user's profile on the social networking system may be presented with media items that the user's friends may have purchased. This presents a mechanism for applications to present information that they are very likely to be interested in and to filter out information a user is not interested in.

Summary

The foregoing description of the embodiments of the disclosure has been presented for the purpose of illustration; it is not intended to be exhaustive or to limit the systems and methods to the precise forms disclosed. Persons skilled in the relevant art can appreciate that many modifications and variations are possible in light of the above disclosure.

Some portions of this description describe the embodiments of the systems and methods in terms of algorithms and symbolic representations of operations on information. These algorithmic descriptions and representations are commonly used by those skilled in the data processing arts to convey the substance of their work effectively to others skilled in the art. These operations, while described functionally, computationally, or logically, are understood to be implemented by computer programs or equivalent electrical circuits, microcode, or the like. Furthermore, it has also proven convenient at times, to refer to these arrangements of operations as modules, without loss of generality. The described operations and their associated modules may be embodied in software, firmware, hardware, or any combinations thereof.

Any of the steps, operations, or processes described herein may be performed or implemented with one or more hardware or software modules, alone or in combination with other devices. In one embodiment, a software module is implemented with a computer program product comprising a computer-readable medium containing computer program code, which can be executed by a computer processor for performing any or all of the steps, operations, or processes described.

Embodiments of the systems and methods may also relate to an apparatus for performing the operations herein. This apparatus may be specially constructed for the required purposes, and/or it may comprise a general-purpose computing device selectively activated or reconfigured by a computer program stored in the computer. Such a computer program may be stored in a non-transitory, tangible computer readable storage medium, or any type of media suitable for storing electronic instructions, which may be coupled to a computer system bus. Furthermore, any computing systems referred to in the specification may include a single processor or may be architectures employing multiple processor designs for increased computing capability.

Embodiments of the systems and methods may also relate to a product that is produced by a computing process described herein. Such a product may comprise information resulting from a computing process, where the information is stored on a non-transitory, tangible computer readable storage medium and may include any embodiment of a computer program product or other data combination described herein.

Finally, the language used in the specification has been principally selected for readability and instructional purposes, and it may not have been selected to delineate or circumscribe the inventive subject matter. It is therefore intended that the scope of the systems and methods systems and methods be limited not by this detailed description, but rather by any claims that issue on an application based hereon. Accordingly, the disclosure of the embodiments of the systems and methods are intended to be illustrative, but not limiting, of the scope of the disclosure, which is set forth in the following claims.

What is claimed is:

1. A computer program product comprising a non-transitory computer-readable storage medium containing computer program code for causing a processor to perform instructions comprising:
    receiving a request for information from a user profile of a user of a social networking system, the request received by a local social networking application running on a user terminal device operated by the user and originating from a third-party application running on the user terminal device;
    sending a request from the local social networking application to the social networking system for the requested information from the user profile;
    receiving the requested information at the local social networking application from the social networking system; and
    providing the requested information from the local social networking application to the third-party application.

2. The computer program product of claim 1, wherein the request for information includes a request for the user's friend's list.

3. The computer program product of claim 1, wherein the request for information includes a request for the user's notifications.

4. The computer program product of claim 1, wherein the request for information includes a request for messages sent to the user in the social networking system.

5. The computer program product of claim 1, wherein the request for information includes a request for information about activities of the user's friends.

6. The computer program product of claim 5, wherein the activities relate to the third-party-application.

7. The computer program product of claim 1, further comprising code for causing a processor to perform instructions comprising:
    receiving, at the local social networking application, content from the third-party application running on the user terminal device; and
    sending the content from the local social networking application to the social networking system.

8. The computer program product of claim 1, wherein the third-party application is configured to use at least a portion of the requested information to personalize its application content for the user.

9. The computer program product of claim 1, wherein the request includes criteria to filter the requested information.

10. A computer program product comprising a non-transitory computer-readable storage medium containing computer program code for causing a processor to perform instructions comprising:
    receiving, at a social networking system, a request for information from a user profile of a user of the social networking system, the request received from a local social networking application running on a user terminal device operated by the user and made responsive to a request from a third-party application running on the user terminal device;
    determining whether to provide the requested information;
    retrieving the requested information from the user profile of the user; and
    sending the requested information from the social networking system to the local social networking application, wherein the local social networking application provides the requested information to the third-party application.

11. The computer program product of claim 10, wherein determining whether to provide the requested information includes determining whether privacy settings of the user allows the third-party application to access the requested information.

12. The computer program product of claim 11, wherein the user's privacy settings allows the third-party application to access a subset of the requested information.

13. The computer program product of claim 10, wherein the request for information includes a request for information associated with friends of the user, and wherein determining whether to provide the requested information includes determining whether privacy settings of the user and privacy settings of the friends of the user allow the third-party application to access the requested information.

14. The computer program product of claim 10, wherein the request for information includes filter criteria and wherein the requested information is filtered by the filter criteria.

15. A computer program product comprising a non-transitory computer-readable storage medium containing computer program code for causing a processor to perform instructions comprising:
    sending a request for information from a user profile of a user of a social networking system from a third-party application running on a user terminal device to a local social networking application running on the user terminal device, wherein the local social networking application provides the request to the social networking system;
    receiving, at the third-party application, the requested information from the local social networking application; and
    presenting the requested information to the user along with information from the third-party application.

16. The computer program product of claim 1, wherein the user terminal device is a mobile device.

17. The computer program product of claim 10, wherein the user terminal device is a mobile device.

18. The computer program product of claim 15, wherein the user terminal device is a mobile device.

19. A method comprising:
    receiving, by a processor executing instructions, a request for information from a user profile of a user of a social networking system, the request received by a local social networking application running on a user terminal device operated by the user and originating from a third-party application running on the user terminal device;
    sending, by the processor, a request from the local social networking application to the social networking system for the requested information from the user profile;
    receiving, by the processor, the requested information at the local social networking application from the social networking system; and
    providing, by the processor, the requested information from the local social networking application to the third-party application.

20. The method of claim 19, wherein the request for information includes a request for the user's friend's list.

21. The method of claim 19, wherein the request for information includes a request for the user's notifications.

22. The method of claim 19, wherein the request for information includes a request for messages sent to the user in the social networking system.

23. The method of claim 19, wherein the request for information includes a request for information about activities of the user's friends.

24. The method of claim 23, wherein the activities relate to the third-party- application.

25. The method of claim 19, further comprising:
receiving, at the local social networking application, content from the third-party application running on the user terminal device; and
sending, by the processor, the content from the local social networking application to the social networking system.

26. The method of claim 19, wherein the third-party application is configured to use at least a portion of the requested information to personalize its application content for the user.

27. The method of claim 19, wherein the request includes criteria to filter the requested information.

28. The method of claim 19, wherein the user terminal device is a mobile device.

29. A method comprising:
receiving, by a processor at a social networking system executing instructions, a request for information from a user profile of a user of the social networking system, the request received from a local social networking application running on a user terminal device operated by the user and made responsive to a request from a third-party application running on the user terminal device;
determining, by the processor, whether to provide the requested information;
retrieving, by the processor, the requested information from the user profile of the user; and
sending, by the processor, the requested information from the social networking system to the local social networking application, wherein the local social networking application provides the requested information to the third-party application.

30. The method of claim 29, wherein determining, by the processor, whether to provide the requested information includes determining, by the processor, whether privacy settings of the user allows the third-party application to access the requested information.

31. The method of claim 30, wherein the user's privacy settings allows the third-party application to access a subset of the requested information.

32. The method of claim 29, wherein the request for information includes a request for information associated with friends of the user, and wherein determining whether to provide the requested information is includes determining whether privacy settings of the user and privacy settings of the friends of the user allow the third-party application to access the requested information.

33. The method of claim 29, wherein the request for information includes filter criteria and wherein the requested information is filtered by the filter criteria.

34. The method of claim 29, wherein the user terminal device is a mobile device.

35. A method comprising:
sending, by a processor executing instructions, a request for information from a user profile of a user of a social networking system from a third-party application running on a user terminal device to a local social networking application running on the user terminal device, wherein the local social networking application provides the request to the social networking system;
receiving, by the processor, at the third-party application, the requested information from the local social networking application; and
providing, by the processor, the requested information for presentation to the user along with information from the third-party application.

36. The method of claim 35, wherein the user terminal device is a mobile device.

* * * * *